(12) United States Patent
Richards

(10) Patent No.: US 11,493,791 B2
(45) Date of Patent: Nov. 8, 2022

(54) DISPLAY AND LIGHT BLOCKING SCREENS

(71) Applicant: GM GLOBAL TECHNOLOGY OPERATIONS LLC, Detroit, MI (US)

(72) Inventor: Benjamin J. Richards, Burbank, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 17/189,784

(22) Filed: Mar. 2, 2021

(65) Prior Publication Data

US 2022/0283458 A1    Sep. 8, 2022

(51) Int. Cl.
| | | |
|---|---|---|
| *G02F 1/133* | (2006.01) | |
| *G02F 1/137* | (2006.01) | |
| *B60J 3/04* | (2006.01) | |
| *B60K 35/00* | (2006.01) | |

(52) U.S. Cl.
CPC ............ *G02F 1/13312* (2021.01); *B60J 3/04* (2013.01); *G02F 1/137* (2013.01); *B60K 35/00* (2013.01); *B60K 2370/1529* (2019.05); *G02F 2203/30* (2013.01)

(58) Field of Classification Search
CPC .... G02F 1/13312; G02F 2203/30; B60J 3/04; B60K 2370/1529; B60K 35/00
USPC .......................................................... 349/16
See application file for complete search history.

(56) References Cited

U.S. PATENT DOCUMENTS

| | | | |
|---|---|---|---|
| 9,448,449 B2 | 9/2016 | Ramanathan | |
| 9,601,083 B2 | 3/2017 | Ramanathan | |
| 10,843,535 B1 | 11/2020 | Mazuir et al. | |
| 2006/0158715 A1 | 7/2006 | Furusawa et al. | |
| 2015/0273989 A1* | 10/2015 | Momot ............... | G02F 1/13306 349/14 |
| 2016/0361980 A1 | 12/2016 | Huber | |
| 2018/0128044 A1 | 5/2018 | Ochiai et al. | |
| 2018/0188531 A1 | 7/2018 | Dubey et al. | |
| 2018/0204538 A1 | 7/2018 | Reckamp et al. | |
| 2019/0146216 A1 | 5/2019 | Mourou et al. | |
| 2020/0070480 A1 | 3/2020 | Sakurai | |
| 2020/0209623 A1 | 7/2020 | Kim | |
| 2021/0117695 A1 | 4/2021 | Salter et al. | |
| 2021/0294099 A1 | 9/2021 | Anzai et al. | |

* cited by examiner

*Primary Examiner* — Edward J Glick
*Assistant Examiner* — William D Peterson
(74) *Attorney, Agent, or Firm* — Quinn IP Law

(57) ABSTRACT

A light blocking screen includes a liquid crystal array mounted to a window. The liquid crystal array has a plurality of liquid crystal (LC) pixels, each of which is selectively darkenable. A controller is operatively connected to the liquid crystal array and configured to darken a set of the LC pixels, such that the darkened set of LC pixels limits light passage through the window in one or more selected areas. The LC pixels need not limit light passage through the entire window. The controller may determine a location of a glare source relative to the window and a location of a user proximate the window, and then darken the set of the LC pixels in an area between the glare source and the user, such that the glare source is limited from shining onto the user. The screen may be incorporated into vehicles or buildings.

17 Claims, 4 Drawing Sheets

DISPLAY AND LIGHT BLOCKING SCREENS

INTRODUCTION

The present disclosure relates to display and light blocking screens. In some aspects of the disclosure, portions of the screens may be used with various types of vehicles.

SUMMARY

A display or light blocking screen is provided. The light blocking screen includes a liquid crystal array mounted to a window. The liquid crystal array has a plurality of liquid crystal (LC) pixels, each of which is selectively darkenable. A controller is operatively connected to the liquid crystal array and is configured to selectively darken a set of the LC pixels, such that the darkened set of the LC pixels limits light passage through the window in one or more selected areas. The LC pixels need not limit light passage through the entire window.

The controller may be configured to determine a location of a glare source relative to the window and to determine a location of a user proximate the window. The controller may then selectively darken the set of the LC pixels in an area between the glare source and the user, such that the glare source is limited from shining onto the user.

In some configurations, the controller is configured to receive a signal from a user that defines the set of LC pixels to darken. The display screen, or different aspects thereof, may be operatively attached to, or incorporated within, one or more windows of a vehicle. Alternatively, the display screen may be a standalone unit or incorporated into a building.

The controller may also selectively darken the set of LC pixels in an area between the sun and a sensor farm of a vehicle when the intensity of the glare source is greater than a overload value on the sensor farm. Liquid crystal arrays may be mounted to the plurality of windows of a vehicle, and the controller may determine whether a total sun load entering the vehicle through the plurality of windows is above a sun load limit. The controller then tints at least two of the plurality of liquid crystal arrays when the total sun load is greater than the sun load limit.

The controller may be configured to display a grayscale exterior display on a selection of the LC pixels of the liquid crystal array, such that the grayscale exterior display is viewable through from outside of the window, which may be a passenger window of a vehicle. The controller may darken the LC array layer across substantially the entire window, such that the window acts as a projection surface upon which a projector casts static images or dynamic images.

In some configurations, the liquid crystal array is mounted to a windshield of a vehicle and covers substantially the entire windshield. The controller may determine a location of the sun relative to the windshield and a location of a driver of the vehicle, and selectively darken the set of the LC pixels in an area between the sun and the driver, such that the sun is limited from shining onto the driver. The liquid crystal array may be mounted to a passenger window of the vehicle, and the controller configured to receive a signal from a user that defines the set of LC pixels to darken on the passenger window.

The above features and advantages and other features and advantages of the present disclosure are readily apparent from the following detailed description of the best modes for carrying out the disclosure when taken in connection with the accompanying drawings.

DETAILED DESCRIPTION

Figure 1:
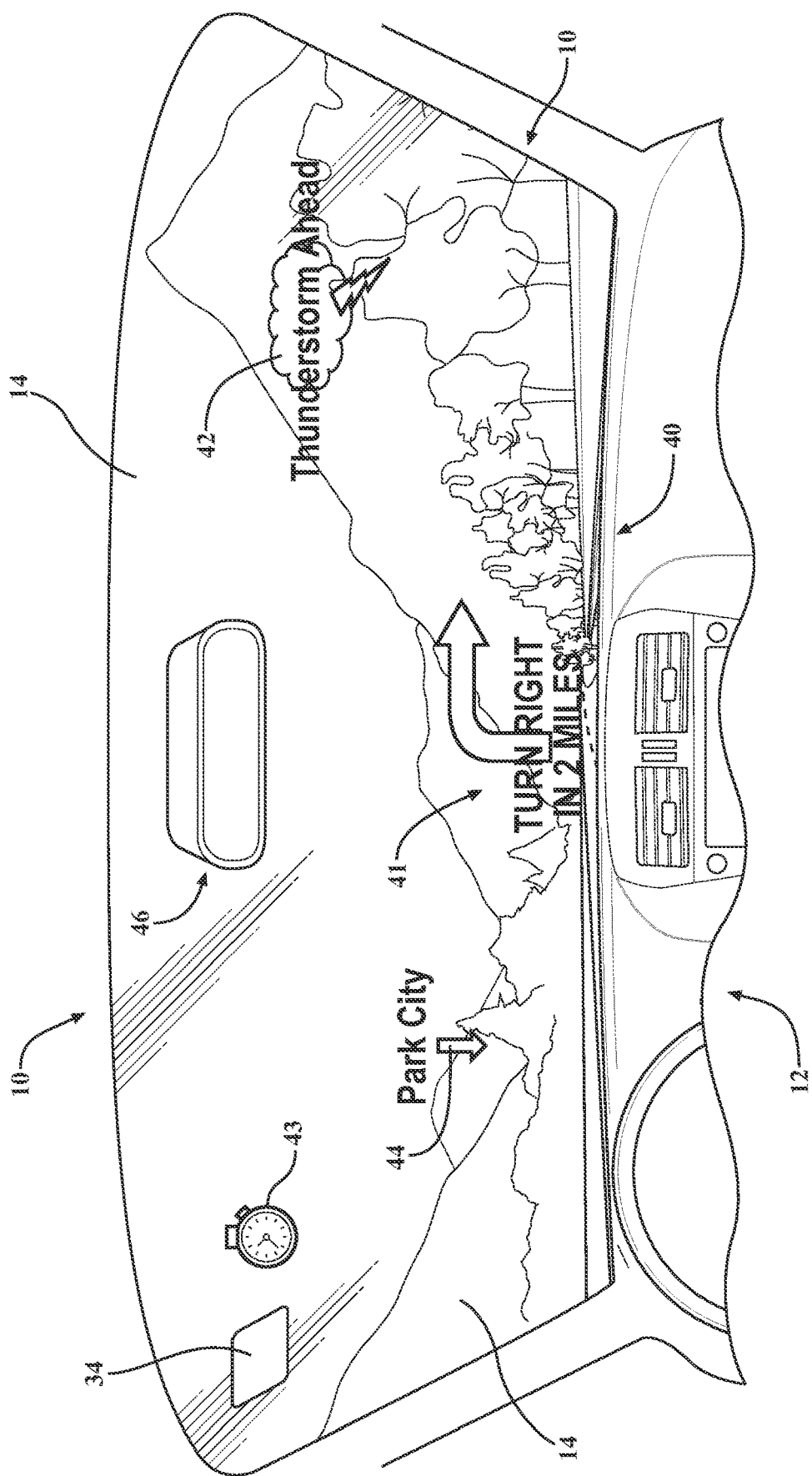
FIG. 1 is a schematic diagram of a vehicle interior having a display and light blocking screen mounted to a windshield.
Figure 2:
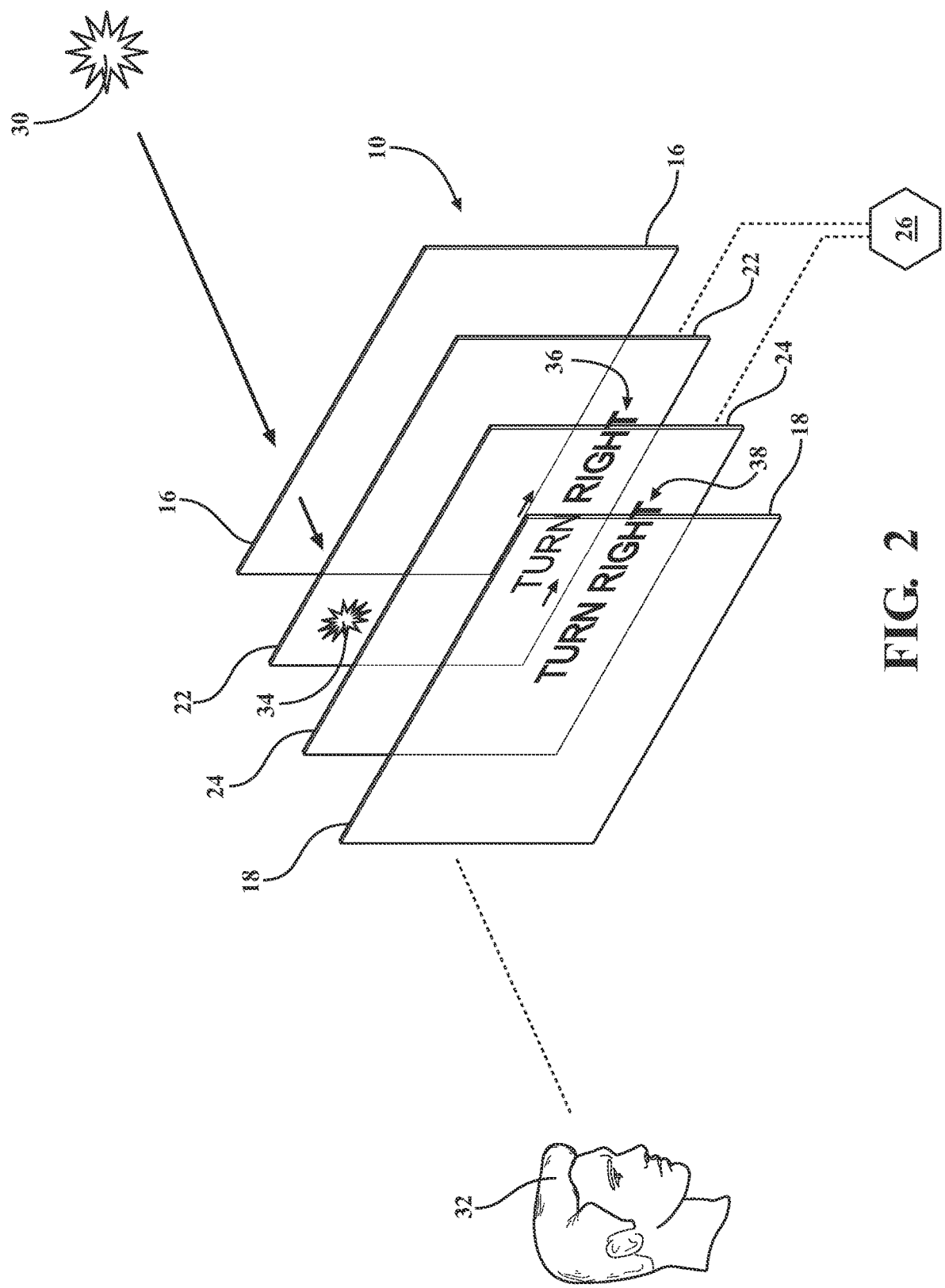
FIG. 2 is a schematic diagram of the display and light blocking screen in a partially exploded view and illustrating light blocking.

Referring to the drawings, like reference numbers refer to similar components, wherever possible. FIG. 1 schematically illustrates a display and light blocking screen, which may be referred to simply as a display screen 10, which is mounted to a vehicle 12. FIG. 2 schematically illustrates an exploded view of the display screen 10 and some of its functionality. The display screen 10 is also a selectively darkenable screen or a light blocking screen. FIGS. 1 and 2 may be discussed simultaneously to explain some of the features and capabilities of the display screen 10, both when incorporated into the vehicle 12 and when used on its own.

In the example shown, the display screen 10 is incorporated into a windshield 14 of the vehicle 12. However, the display screen 10 may be mounted to, or incorporated with, many other structures, including, without limitation, building windows or glass walls. Housing windows or protective screens for retail applications may also utilize one or more components of the display screens 10. All of these structures are included in the definition of window for this description. Additionally, the display screen 10 may be configured as a standalone unit and used as, for example, and without limitation, a monitor or television screen.

Furthermore, the display screen 10 may be mounted to, or incorporated with, any of the windows of the vehicle 12, including the roller passenger windows and overhead or roof windows. Note that only a portion of the vehicle 12 is shown, and the viewpoint of FIG. 1 is from the interior or passenger compartment.

The drawings and figures presented herein are diagrams, are not to scale, and are provided purely for descriptive purposes. Thus, any specific or relative dimensions or alignments shown in the drawings are not to be construed as limiting. While the disclosure may be illustrated with respect to specific applications or industries, those skilled in the art will recognize the broader applicability of the disclosure. Those having ordinary skill in the art will recognize that terms such as "above," "below," "upward," "downward," et cetera, are used descriptively of the figures, and do not represent limitations on the scope of the disclosure, as defined by the appended claims. Any numerical designations, such as "first" or "second" are illustrative only and are not intended to limit the scope of the disclosure in any way.

Features shown in one figure may be combined with, substituted for, or modified by, features shown in any of the figures. Unless stated otherwise, no features, elements, or limitations are mutually exclusive of any other features, elements, or limitations. Furthermore, no features, elements, or limitations are absolutely required for operation. Any specific configurations shown in the figures are illustrative only and the specific configurations shown are not limiting of the claims or the description.

The term vehicle is broadly applied to any moving platform. Vehicles into which the disclosure may be incorporated include, for example and without limitation: passenger or freight vehicles; autonomous driving vehicles; industrial, construction, and mining equipment; and various types of aircraft.

All numerical values of parameters (e.g., of quantities or conditions) in this specification, including the appended claims, are to be understood as being modified in all instances by the term about whether or not the term actually appears before the numerical value. About indicates that the stated numerical value allows some slight imprecision (with some approach to exactness in the value; about or reasonably close to the value; nearly). If the imprecision provided by about is not otherwise understood in the art with this ordinary meaning, then about as used herein indicates at least variations that may arise from ordinary methods of measuring and using such parameters. In addition, disclosure of ranges includes disclosure of all values and further divided ranges within the entire range. Each value within a range and the endpoints of a range are hereby all disclosed as separate embodiments.

When used herein, the term "substantially" often refers to relationships that are ideally perfect or complete, but where manufacturing realities prevent absolute perfection. Therefore, substantially denotes typical variance from perfection. For example, if height A is substantially equal to height B, it may be preferred that the two heights are 100.0% equivalent, but manufacturing realities likely result in the distances varying from such perfection. Skilled artisans will recognize the amount of acceptable variance. For example, and without limitation, coverages, areas, or distances may generally be within 10% of perfection for substantial equivalence. Similarly, relative alignments, such as parallel or perpendicular, may generally be considered to be within 5%.

As illustrated in FIG. 2, the display screen 10 may be incorporated between window layers or panels, such as an outer glass 16 and an inner glass 18. As used herein, the term glass refers to any transparent, semi-transparent, or translucent structure, and may include, without limitation: silicas-based window glass, plastic, composites, combinations thereof, or other application-suitable glass materials. The display screen 10 is not limited by the type of surfaces to which it may be attached or between which it may be placed. The outer glass 16 may be representative of building walls or windows, and the inner glass 18 may be a protective layer for the display screen 10.

Where the display screen 10 is used with the vehicle 12, vehicular or automotive glass used for one or more windows refers to any material capable of being placed onto vehicles as a separator between interior and exterior, that generally conform to the relevant requirements. Skilled artisans will recognize the types of surfaces to which the display screen 10 may be attached, or placed between, depending on the exact circumstances of the surrounding area. Furthermore, note that the term windows, as used herein, includes the mirrors of the vehicle 12. The outer glass 16 and the inner glass 18 may be representative of different layers of the windshield 14.

A liquid crystal (LC) array layer 22 is operatively placed next to the outer glass 16 and includes a plurality of LC pixels. Each pixel of the LC array layer 22 can vary its level of transparency, from substantially clear to substantially opaque. Skilled artisans will recognize mechanism for varying the darkness of the LC pixels, which is generally changed as the crystals twist in response to varying voltage applied to specific pixels.

A transparent LED layer 24 is operatively placed between the LC array layer 22 and the inner glass 18. The LED layer 24 has a plurality of LED pixels. Both the LC array layer 22 and the transparent LED layer 24 are flexible, such that the display screen 10 may be curved. The combined LC array layer 22 and the LED layer 24 of the display screen 10 creates a transparency-dynamic display for interior passenger information, entertainment, personalization, and comfort.

The LC array layer 22 and the LED layer 24 of the display screen 10 each include a high number of pixels. Depending on the size of the window, there may be hundreds or thousands of pixels in each layer. In some configurations of the display screen 10, the LC array layer 22 and the transparent LED layer 24 may have substantially similar numbers of pixels. However, the numbers of pixels need not always match. For example, some configurations of the LC array layer 22 may have additional pixels, as the LC array layer 22 may have pixels nearer the perimeter of the window than the LED layer 24.

The transparent LED layer 24 may be an organic or inorganic layer. The LED layer 24 may be formed from, for example and without limitation, organic light emitting diode (OLED), or inorganic light emitting diode. Skilled artisans will recognize types and configurations of the LED systems that may be used for the transparent LED layer 24. The LED system may include a red, green, blue, white (RGBW) diode matrix that emits light through the full visible spectrum. A transparent LED layer 24 may be achieved using transparent conductive layers, and LEDs provides bright color without needing an external light source.

The LED layer 24 shown in the figures is highly schematic. Skilled artisans will recognize that the component may further include anode and cathode layers, in addition to the emissive layer. Contrast for the LED layer 24 may be achieved by having a dark background, which can be provided by the LC array layer 22. Also note that the display screen 10 may include one or more polarized filter layers.

A control system or controller 26 is operatively in communication with the LC array layer 22 and the transparent LED layer 24 and is configured to control operations thereof. The controller 26 includes a non-generalized, electronic control device having a preprogrammed digital computer or processor, a memory or non-transitory computer readable medium used to store data such as control logic, instructions, lookup tables, etc., and a plurality of input/output peripherals, ports, or communication protocols. The controller 26 is configured to implement or execute the control logic or instructions described herein.

When the display screen 10 is incorporated into the vehicle 12, the controller 26 is operatively in communication with all necessary components of the vehicle 12. Furthermore, the controller 26 may include, or be in communication with, a plurality of sensors, some of which are discussed herein. The controller 26 may be dedicated to the specific aspects of the vehicle 12 described herein, such as controlling only the display screen 10 or aspects related to windows, or the controller 26 may be part of a larger control system that manages numerous functions of the vehicle 12. For standalone display screens 10, such as those not mounted or attached to a vehicle, the controller 26 may be included as part of a housing or separately connected via a cord.

The controller 26 is configured to selectively trigger emission of light from a selection of the LED pixels. Furthermore, the controller 26 is configured to selectively darken a selection of the LC pixels that correspond directly to the selection of LED pixels. Therefore, the emitting LED pixels and the darkened LC pixels generally match and light is emitted only in substantially the opposite direction from the LC array layer 22—i.e., toward the interior of the vehicle 12.

The LC pixels create contrast for the LED pixels, which might otherwise be washed out from view by background lighting conditions. In some situations, in order to produce better contrast, the LC pixels may form a halo or additional surrounding base around the matching LED pixels to produce additional contrast. The combined effect of the matching LED pixels and LC pixels allows the display screen 10 to display, for example, and without limitation, images, messages, or video (dynamic images).

In FIG. 2, the display screen 10 is shown with both the LC array layer 22 and the LED layer 24. However, in some configurations, only the LC array layer 22 may be mounted to a window. For example, the LC array layer 22 may be used individually as an on-demand, selectively darkenable screen for the vehicle 12, such as curved across some, or all, of the windshield 14 or one of the other windows.

The controller 26 is operatively connected to the LC array layer 22, such that it is configured to selectively darken a set of the LC pixels to limit light passage through the window in one or more selected areas. For example, the controller 26 may darken an area of the LC pixels in order to block passage of bright light from the sun 30 or another source of glare that may obstruct vision of the driver or passengers.

As such the controller 26 is configured to determine a location of the sun 30, or another source of glare, relative to the windshield 14. The controller 26 is also configured to determine or estimate a location of a driver, and particularly the driver's head or head area 32, within the vehicle 12. Then, the controller 26 selectively darkens a set of the LC pixels in an area between the sun 30 and the driver, such that the sun 30 is limited from shining onto the driver and disturbing vision.

FIG. 2 schematically illustrates how direct light from the sun 30 is stopped by the LC array layer 22 by a glare block area 34. This would be similar where the controller 26 identifies another glare source, such as oncoming headlights or other bright lights shining onto the vehicle 12. Note that the controller 26 may use sensors of the vehicle 12 and HD maps may be used to accurately track the headlight glare as it moves across the windshield 14 and to provide automatic localized dimming that ensures that the driver's vision is not compromised.

Note that this aspect of the disclosure is independent of, and may be used in display screens 10 that do not include, the LED layer 24. Importantly, the controller 26 darkens one or more selected glare block areas 34 without limiting light passage through the entire window. Therefore, light from the sun 30 is blocked from the driver's vision, but the remainder of the windshield 14 is substantially usable for driving.

The position of the sun 30 may be determined through a variety of sensors and/or systems, including, without limitation: GPS and navigational systems, vehicular compass, and topographical maps. Furthermore, the driver's head area 32 may be identified, determined, or estimated, based on, for example and without limitation: estimates of standard population models—i.e., the average person's head area 32 will be in a general area—or based on sensors within the vehicle 12 that monitor or determine the location of the actual head or of the head area 32 based on the specific driver or passenger.

For many configurations of the display screen 10, each LC pixel will be selectively darkenable by the controller 26 along a gradient between substantially clear and substantially opaque. Therefore, visibility through the window may be phased in moving outward from the glare block area 34, such that partial light blocking occurs on the edges of the glare block area 34 fading back to the transparency level of the remainder of the window.

Note that the glare block area 34 may be implemented on any of the windows of the vehicle 12, not just the windshield 14. For example, low horizon light from the sun 30 may shine through one of the front passenger windows—i.e., any of the windows other than the windshield—and bother the driver's vision. Furthermore, the controller 26 may be configured to provide a similar glare block area 34 for a passenger of the vehicle 12, using similar techniques.

Additionally, the glare blocking capabilities of the LC array layer 22 may be applied to one or more mirrors of the vehicle 12. Users may selectively darken portions of the mirror to reduce glare, or the controller 26 may automatically adjust the amount of light reflecting off any of the mirrors.

Furthermore, the glare blocking capabilities of the LC array layer 22 may be applied to standalone display screens 10, to those mounted to building windows, or other applications. The controller 26 may be configured to determine the position of an occupant or user proximate to the interior (relative to the light source) of the display screen 10 and to determine the location of the source of glare. Whether a user or occupant is proximate the display screen 10 will be application specific, such that proximate to a large display screen 10 attached to a large building window may be different than proximate to smaller applications. The controller 26 may then darken an area of the LC array layer 22 between the glare source and the occupant, such that the glare block area 34 prevents bright glare from affecting the user, occupant, or observer.

The glare blocking capabilities of the LC array layer 22 are position specific, due to the high number of LC pixels incorporated into the LC array layer 22. This contrasts with entire screens that darken or lighten as one—i.e., a single pixel system.

As illustrated in FIGS. 1 and 2, the display screen 10 may include both the LC array layer 22 and the transparent LED layer 24. This combination provides improved display of, for example, and without limitation, messages, images, and videos, in addition to selective light blocking by the LC array layer 22.

In order to produce an output viewable from inside the vehicle 12, the LC array layer 22 and the LED layer 24 work together with substantially matching LC pixels and LED pixels. As schematically illustrated in FIG. 2, the controller 26 causes the LC array layer 22 to darken a set of LC pixels to form an LC message 36. The controller 26 also coordinates the LED layer 24 to emit light from a set of LED pixels to form an LED message 38. Therefore, the LC array layer 22 selectively provides an opaque, semi-opaque, or semi-transparent background for the light selectively emitted by the LED layer 24.

The LC message 36 and the LED message 38 are formed from pixels that are substantially matching between the respective layers. However, in some configurations, the LC message 36 may be slightly larger than the LED message 38, such that the LC message 36 provides additional light blocking and contrast, such as a dark halo, for the LED message 38.

In the illustrated example, the LC message 36 and the LED message 38 form a navigational instruction on the display screen 10, which may be derived from a navigation system that is in communication with the controller 26. Notably, this navigational message is widely viewable by multiple occupants of the vehicle 12, not just the driver, as is the case with alterative systems and many heads-up displays. The LC message 36 and the LED message 38 may be used to form nearly an infinite number of static and dynamic images (i.e., video).

Many alternative display screens, whether mounted in vehicle window or as standalone displays, use either backlights or edge lights, and often use opaque backing members in order to allow the displayed images to be seen. Contrarily, the display screen 10 lacks any backlight and, particularly, lacks a backlight opposite the LC array layer 22 from the transparent LED layer 24. Additionally, the display screen 10 lacks an opaque backing member opposite the LC array layer 22 from the transparent LED layer 24.

FIG. 1 illustrates the display screen 10 turning much of the windshield 14 into a heads-up display 40. Note that the heads-up display 40 created by the display screen 10 is viewable by many, if not all, of the occupants of the vehicle 12. Alternative heads-up displays often have limited viewing range, such that they are only viewable by the driver, and are only viewable on a very small area of the windshield.

The heads-up display 40 illustrated in FIG. 1 includes several message and display elements. Each of the message and display elements is formed by a combination of LC pixels forming an LC message 36 and LED pixels forming an LED message 38. The specific displays and messages shown are illustrative only, and skilled artisans will recognize further applications of the heads-up display 40 that may be provided by the display screen 10. A navigation message 41 indicates an upcoming turn. An informational message 42 indicates impending weather events. Informational messages 42 may also be useful for alerting the driver or passengers to, for example and without limitation: incoming phone or video calls and incoming emails or text messages.

A clock 43 is displayed to assist occupants in telling the time. A spatial identifier 44 may be used to note points of interest within the heads-up display 40. In addition to the message shown, which identifies a nearby city, the spatial identifier 44 may be useful for displaying the location of services of interest, such as, for example and without limitation: refueling or recharging stations, restaurants, or sight-seeing areas. The spatial identifier 44 may incorporate the ability of the controller 26 to estimate the driver's head area 32, or the head area of a specific occupant, such that the spatial identifier is properly located relative to the target occupant's line of sight.

In the schematic example of FIG. 1, the display screen 10 is also blocking a glare source, such as from the sun 30. The glare block area 34 is shown in the upper left corner of the windshield 14. The glare block area 34 may be formed solely by the LC array layer 22. However, in some situations, the LED layer 24 may contribute to the glare block area 34. For example, the clock 43 may use or overlap the darkened glare block area 34 for contrast.

FIG. 1 illustrates a rearview mirror with a sensor farm 46 included as part of the rearview mirror housing. The sensor farm 46 is shown mounted adjacent to the windshield 14 but may be located on other windows or elsewhere on the vehicle 12. The sensor farm 46 may include, for example and without limitation, one or more forward-looking cameras, LIDAR (Light Detection and Ranging), and RADAR (Radio Detection and Ranging). Many of these components may be used by automated driving systems but may also be used by drivers and passengers of the vehicle 12.

The controller 26 may also be configured to determine the intensity of a light source cast onto the sensor farm 46, such that the controller 26 determines when the intensity reaches an overload value. Then, the controller 26 may selectively darken a set of LC pixels in an area between the light source and the sensor farm 46 when the intensity is greater than the overload value. In many instances, the LC pixels may be darkened to a level less than substantially opaque, such that the camera or sensors are still able to operate. This aspect may limit camera or sensor wash out from glare, which may occur as a result of oncoming headlights, the sun 30, or other light sources. In some situations, the sensor farm 46, itself, may be able to alert the controller 26 that there is wash out of one or more sensors.

Note that the cameras or other elements of the sensor farm 46 may be used to estimate the position of the sun 30 relative to the vehicle 12 and its occupants. The sensor farm 46 may also be useful in determining the location of other sources of glare, such as oncoming headlights or other bright lights cast into the vehicle 12.

Figure 3:
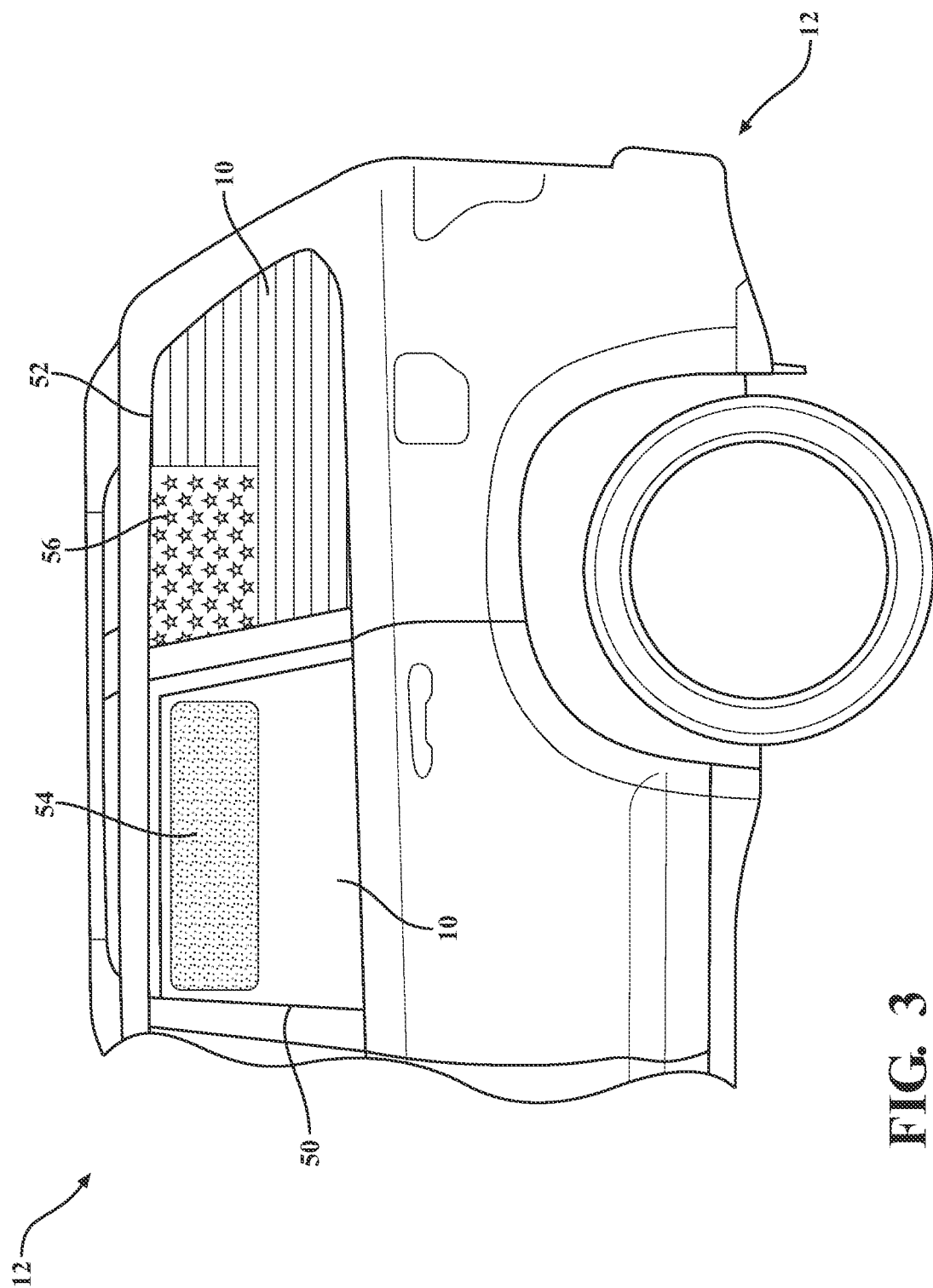
FIG. 3 is a schematic diagram of the rear portion of the vehicle, illustrating various aspects of multiple display and light blocking screens.

Referring also to FIG. 3, and with continued reference to FIGS. 1 and 2, there is shown a rearward portion of the vehicle 12. In the view of FIG. 3, the vehicle 12 is an SUV. However, as discussed above, the vehicle 12 is representative of numerous moving platforms.

As shown in the view FIG. 3, the vehicle 12 includes additional windows, including a rear door window 50 and a rear fixed window 52. Both the rear door window 50 and the rear fixed window 52 include display screens 10. Note that the opposite side, the roof, and the back side of the vehicle 12 may include windows that may also have display screens 10 incorporated therewith. The display screens 10 shown may include only the LC array layer 22 or may include both the LC array layer 22 and the LED layer 24.

In some configurations of the display screen 10, a user of the vehicle 12, such as the driver or one of the passengers/occupants, defines the set of LC pixels to darken for light blocking, such that the controller 26 is configured to receive an input signal from the occupant that is indicative of the set of LC pixels to darken. This may include small areas or spots, such as the glare block area 34, or may be larger areas, such as a virtual visor 54 shown in the rear door window 50, which may be referred to as a passenger window. The virtual visors 54 may be darkened gray areas or may be substantially opaque. Furthermore, the virtual visors 54 may be movable or adjustable to account for different angles and intensities of glare, such as from the sun 30.

Users may define the location of the darkened LC pixels—whether glare block areas 34, virtual visors 54, or other darkened areas—through various means, including, without limitation: input systems or gestures. For example, and without limitation, the users may access touch screens or button controls, or used voice activated systems to vary the intensity and location of the darkened areas. Additionally, the controller 26 may be in communication with interior sensors that interpret gestures made by users of the vehicle 12 and determine, based on those gestures or movements, where glare block areas 34 or virtual visors 54 should be located on the various windows.

Where many windows of the vehicle 12 include display screens 10, and particularly the LC array layer 22, the controller 26 may be configured to determine whether a total sun load entering the vehicle 12 through the plurality of windows is above a sun load limit. If total sun load is greater than the sun load limit, the controller 26 may tint at least two of the plurality of LC array layers 22 on the windows. Tinting refers to darkening the entire viewable surface of the window, such the reduced light passes through the tinted window. This may limit the amount of total ambient light from the sun 30—i.e., the sun load—incoming to the greenhouse formed by the windows of the vehicle 12.

By tinting several of the windows, the controller 26 limits greenhouse effects when the vehicle 12 is parked on sunny days, such that there is reduced energy needed to cool the vehicle 12. Additionally, there may be situations in which the sun load is so substantial that it may be difficult for air conditioning systems to cool the vehicle 12 to the temperature desired by the occupants.

In some cases, the windshield 14 will not be subject to tinting, particularly where a human driver is in control of the vehicle 12. However, for autonomous vehicles 12, all of the windows may be darkened. Furthermore, the controller 26 may receive input commands from users of the vehicle 12, such that one or more windows are darkened by the users. For example, and without limitation, users may prefer that the windows are darkly tinted for privacy while the vehicle 12 is driving in autonomous mode, or while the vehicle 12 is parked, such as for rest breaks during long-distance personal or professional drives.

As shown in FIG. 3, the display screen 10 may also be configured to create an exterior display 56, which may be a message, static image(s), or dynamic images/video. In the example shown, the exterior display 56 is on the rear fixed window 52 and resembles a flag. In some configurations, the exterior display 56 may be animated, such as a waving flag, or automated, such as a scrolling or changing advertisement.

The controller 26 may be configured to create the exterior display 56 solely in grayscale with a selection of the LC pixels of the LC array layer 22. The grayscale exterior display 56 would be viewable through the window from the exterior of the vehicle 12 and may also provide a reduction in sun load entering the vehicle 12.

Alternatively, the exterior display may be formed in color by the LED layer 24. The controller 26 is configured to trigger emission of the LED pixels to form the exterior display 56, and does so without darkening the matching LC pixels, such that the message is viewable from outside of the window. Note that if the controller 26 triggered the matching LC pixels to the LED pixels, the light emitted from the LED pixels toward the exterior of the vehicle 12 would be substantially blocked by the darkened LC pixels.

Where the LED layer 24 of the display screen 10 creates the exterior display 56, the controller 26 may darken a set of the LC pixels that are non-matching to the exterior display 56 formed by the LED pixels, such that the LC pixels block light passage through the window but do not block light from the LED pixels exiting the window. This effectively creates contrast for exterior viewing of the exterior display 56 provided by the LED layer 24, even if the ambient light is fairly bright.

For example, if the user wanted the flag shown as the exterior display 56 to be black and white, the stars may be formed with white light emitted from the LED pixels of the LED layer 24, and the LC pixels of the LC array layer 22 may darken the areas surrounding those stars with contrasting black or dark gray. This would help the white stars in the exterior display 56 stand out when viewed from either inside or outside of the vehicle 12. This contrast effect from the LC array layer 22 may be particularly useful for displaying advertising information, such as logos or slogans.

Figure 4:
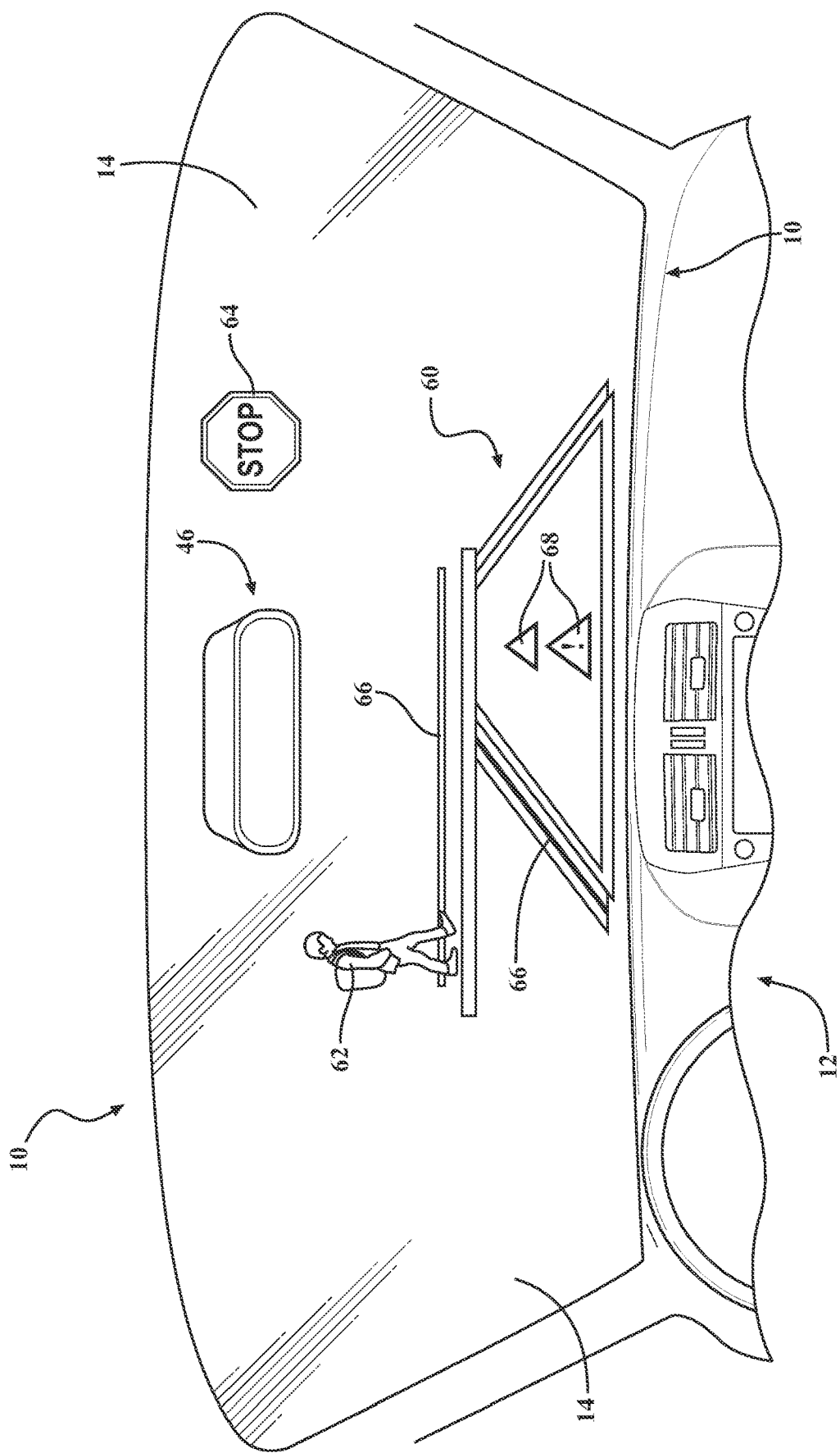
FIG. 4 is a schematic diagram of the vehicle interior, illustrating a virtual vision enhancement on the display and light blocking screen.

Referring also to FIG. 4, and with continued reference to FIGS. 1-3, there is shown another view of the interior of the vehicle 12. In some situations, the vehicle 12 may include a driver assist system, including, without limitation: a RADAR system, a LIDAR system, visible light cameras, infrared cameras, and night vision cameras. The driver assist system may include all, or only some, of the listed systems. The different camera types may individually or collectively be referred to as a camera system. The driver assist system may be incorporated into, or in communication with, the controller 26. Additionally, the driver assist system may incorporate 3D mapping or high-definition mapping, such that the driver assist system includes road markings in the area of the vehicle 12. Some of the components or sensors used for the driver assist system may be incorporated into the sensor farm 46.

Furthermore, the controller 26 or driver assist system may be configured to determine when the driver has limited vision due to, for example and without limitation: fog, heavy rain, snow, smoke, or other vision reducers. In such conditions, the controller 26 may be configured to display a virtual vision enhancement 60 based on interactions with the driver assist systems. Additionally, the virtual vision enhancement 60 may be activated by a user, such as the driver, of the vehicle 12. The virtual vision enhancement 60 may be part of the heads-up display 40 or may be a separate feature.

Therefore, the display screen 10 may display on the windshield 14 of the vehicle 12 a number of different virtual vision enhancement 60 features. Those shown in FIG. 4 are only examples, and skilled artisans will recognize additional features and types of display elements that may be used for the virtual vision enhancement 60. FIG. 4 shows a pedestrian 62 and a road sign 64. The pedestrian 62 is in a crosswalk, which is one of several road markings 66 illuminated by the display screen 10. Additionally, one or more visible alerts 68 may be displayed to alert the driver to unseen objects or situations. Alternative display elements for the virtual vision enhancement 60 may include, without limitation: other vehicles, animals, or objects on the roadway.

The driver assist system may also include audible alerts that work in addition to, or in tandem with, the virtual vision enhancement 60. The combined effects of the driver assist system and the virtual vision enhancement 60 on the display screen 10 may improve the experience for both occupants of the vehicle 12 and for pedestrians and other vehicles.

Note that the display screen 10 may display some of the features of the virtual vision enhancement 60 shown in FIG. 4 even when the driver does not have limited vision. The controller 26 may determine that the situation suggests that the driver is not aware of an impending situation, and may decide to display one or more elements of the virtual vision enhancement 60, such as the visible alerts 68 or audible alerts from the driver assist system.

The vehicle 12 may include a mounted projector that is configured to interact with the display screen 10. In some configurations, the projector may be incorporated into the housing of the rearview mirror and sensor farm 46, or on the instrument panel of the vehicle 12. Alternatively, the projector could be located in a central position, such that there is access to the passenger and rear windows.

The controller 26 may be further configured to darken the LC array layer 22 across substantially an entire window, creating a projection screen, such that the window acts as a projection surface upon which the projector casts static or dynamic images (video). In this context, reference to substantially the entire window means greater than eighty percent of the window. Where the entire window is not darkened or opaque, it is likely the outer edges would be the portions left clear or less darkened. The projection screen feature may involve only the LC array layer 22, as the LED layer 24 may not be required to form the projection screen.

Using a window as a projection screen may be particularly useful on the passenger windows. For example, and without limitation, the projection screen may be used to project infotainment or web conferencing. Note that the projection screen feature could also be used with a portable projector that is not permanently attached to the vehicle 12. With autonomous vehicles, businesspeople may wish to make presentations or engage in web conferences during the ride. These users could trigger the projection screen capability of the display screen 10 and use a portable projector.

Additionally, on windows having a display screen 10 that does not include the LED layer 24, the projector may be able to cast light onto the LC array layer 22 in order to provide some of the display elements illustrated in FIGS. 1 and 4. The controller 26 may be configured to have the LC array layer 22 selectively darken LC pixels in a similar fashion to that shown in the LC message 36 of FIG. 2. However, the light portion of the image would be provided by the projector, instead of the LED pixels. This would be a coordinated effort between the LC array layer 22 and the projector and may be useful in supplementing display capabilities for windows that do not include both the LC array layer 22 and the LED layer 24.

The detailed description and the drawings or figures are supportive and descriptive of the subject matter herein. While some of the best modes and other embodiments have been described in detail, various alternative designs, embodiments, and configurations exist.

Furthermore, any examples shown in the drawings or the characteristics of various examples mentioned in the present description are not necessarily to be understood as examples independent of each other. Rather, it is possible that each of the characteristics described in one of the examples of an embodiment can be combined with one or a plurality of other desired characteristics from other examples, resulting in other examples not described in words or by reference to the drawings. Accordingly, such other examples fall within the framework of the scope of the appended claims.

The invention claimed is:

1. A light blocking screen for a window, comprising:
   a liquid crystal array mounted to the window, wherein the liquid crystal array has a plurality of liquid crystal (LC) pixels, each of which is selectively darkenable, and
   a controller operatively connected to the liquid crystal array, wherein the controller is configured to selectively darken a set of the LC pixels, such that the darkened set of the LC pixels limits light passage through the window in one or more selected areas without limiting light passage through an entirety of the window,
   wherein the window includes a plurality of windows of a vehicle, and the liquid crystal array is a plurality of liquid crystal arrays mounted to the plurality of windows of the vehicle,
   wherein the controller is configured to determine whether a total sun load entering the vehicle through the plurality of windows is above a sun load limit, and
   wherein the controller is configured to tint at least two of the plurality of liquid crystal arrays when the total sun load is greater than the sun load limit.

2. The light blocking screen of claim 1, wherein the liquid crystal array is mounted to a windshield of a vehicle and substantially covers the windshield.

3. The light blocking screen of claim 2, wherein the controller is further configured to:
   determine a location of the sun relative to the windshield and a location of a driver of the vehicle, and
   selectively darken the set of the LC pixels in an area between the sun and the driver, such that the sun is limited from shining onto the driver.

4. The light blocking screen of claim 2, wherein the controller is further configured to:
   determine a location of the sun relative to a sensor farm mounted adjacent to the windshield, and
   determine whether the intensity of sun light cast onto the sensor farm is greater than an overload value, and
   wherein the controller is configured to selectively darken the set of LC pixels in an area between the sun and the sensor farm when the intensity is greater than the overload value.

5. The light blocking screen of claim 1, wherein the controller is further configured to receive a signal from a user that defines the set of LC pixels to darken.

6. A light blocking screen for a window, comprising:
   a liquid crystal array mounted to the window, wherein the liquid crystal array has a plurality of liquid crystal (LC) pixels, each of which is selectively darkenable, and
   a controller operatively connected to the liquid crystal array, wherein the controller is configured to selectively darken a set of the LC pixels, such that the darkened set of the LC pixels limits light passage through the window in one or more selected areas without limiting light passage through an entirety of the window,
   wherein the controller is configured to display a grayscale exterior display on a selection of the LC pixels of the liquid crystal array, such that the grayscale exterior display is viewable through the window, such that the grayscale exterior display is viewable from outside of the vehicle window and forms a viewable image or moving images.

7. The light blocking screen of claim 6, further comprising:
   a projector proximate the window,
   wherein the controller is further configured to darken the liquid crystal array across a substantial entirety of the window, such that the window acts as a projection surface upon which the projector casts static images or dynamic images.

8. The light blocking screen of claim 6, wherein the controller is further configured to:
   determine a location of a glare source relative to the window;
   determine a location of a user proximate the window; and
   selectively darken the set of the LC pixels in an area between the glare source and the user, such that the glare source is limited from shining onto the user.

9. A light blocking screen for a vehicle window, comprising:
   a liquid crystal array mounted to the vehicle window, wherein the liquid crystal array has a plurality of liquid crystal (LC) pixels, each of which is selectively darkenable; and
   a controller operatively connected to the liquid crystal array, wherein the controller is configured to:
   selectively darken a set of the LC pixels, such that the darkened set of the LC pixels limits light passage through the vehicle window in one or more selected areas without limiting light passage through the entire vehicle window;

determine a location of the sun relative to a sensor farm mounted adjacent to the windshield; and determine whether the intensity of sun light cast onto the sensor farm is greater than an overload value, and wherein the controller selectively darkens the set of LC pixels in an area between the sun and the sensor farm when the intensity is greater than the overload value.

10. The light blocking screen of claim 9, wherein the vehicle window includes a plurality of vehicle windows, and the liquid crystal array is a plurality of liquid crystal arrays mounted to the plurality of vehicle windows, wherein the controller is configured to determine whether a total sun load entering the vehicle through the plurality of vehicle windows is above a sun load limit, and wherein the controller is configured to tint at least two of the plurality of liquid crystal arrays when the total sun load is greater than the sun load limit.

11. The light blocking screen of claim 9, wherein the controller is further configured to:

determine a location of the sun relative to the windshield and a location of a driver of the vehicle, and selectively darken the set of the LC pixels in an area between the sun and the driver, such that the sun is limited from shining onto the driver.

12. The light blocking screen of claim 9, wherein the controller is further configured to receive a signal from a user that defines the set of LC pixels to darken on the windshield.

13. The light blocking screen of claim 9, wherein the windshield includes: an outer glass panel and an inner glass panel, and wherein the liquid crystal array is mounted between the outer glass panel and the inner glass panel.

14. The light blocking screen of claim 9, wherein the liquid crystal array is mounted to a passenger window of the vehicle, and wherein the controller is further configured to receive a signal from a user that defines the set of LC pixels to darken on the passenger window.

15. The light blocking screen of claim 9, wherein the liquid crystal array is mounted to a passenger window of the vehicle, and wherein the controller is configured to display a grayscale exterior display on a selection of the LC pixels of the liquid crystal array, such that the grayscale exterior display is viewable through the passenger window from outside of the vehicle, and forms a viewable image or moving images while also selectively darkening the set of LC pixels in an area between the sun and the sensor farm when the intensity is greater than the overload value.

16. The light blocking screen of claim 9, further comprising:

a projector operatively mounted within the vehicle, and wherein the controller is further configured to darken the liquid crystal array across a substantial entirety of the vehicle window, such that the vehicle window acts as a projection surface upon which the projector casts static images or dynamic images.

17. The light blocking screen of claim 9, wherein the controller is further configured to:

determine a location of a glare source relative to the vehicle window;

determine a location of a passenger proximate the vehicle window; and selectively darken the set of the LC pixels in an area between the glare source and the passenger, such that the glare source is limited from shining onto the passenger.

* * * * *